(12) United States Patent
Reinhardt et al.

(10) Patent No.: US 9,797,355 B2
(45) Date of Patent: Oct. 24, 2017

(54) FUEL INJECTION SYSTEM HAVING A FUEL-CONDUCTING COMPONENT, A FUEL INJECTION VALVE AND A CONNECTION ELEMENT

(71) Applicant: Robert Bosch GmbH, Stuttgart (DE)

(72) Inventors: Wilhelm Reinhardt, Oetisheim (DE); Volker Scheef, Ludwigsburg (DE); Michael Mayer, Wannweil (DE); Andreas Rehwald, Bietigheim-Bissingen (DE); Jan Herrmann, Stuttgart (DE); Philipp Rogler, Stuttgart (DE); Andreas Glaser, Stuttgart (DE); Hans-Georg Horst, Leonberg (DE); Martin Riemer, Untergruppenbach (DE); Michael Knorpp, Weissach (DE); Michael Fischer, Niefern-Oeschelbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 43 days.

(21) Appl. No.: 14/761,354

(22) PCT Filed: Jan. 14, 2014

(86) PCT No.: PCT/EP2014/050561
§ 371 (c)(1),
(2) Date: Jul. 16, 2015

(87) PCT Pub. No.: WO2014/111367
PCT Pub. Date: Jul. 24, 2014

(65) Prior Publication Data
US 2016/0025053 A1   Jan. 28, 2016

(30) Foreign Application Priority Data
Jan. 18, 2013 (DE) .................. 10 2013 200 728

(51) Int. Cl.
*F02M 55/00* (2006.01)
*F02M 61/14* (2006.01)
(Continued)

(52) U.S. Cl.
CPC ........ *F02M 55/004* (2013.01); *F02M 55/025* (2013.01); *F02M 61/14* (2013.01);
(Continued)

(58) Field of Classification Search
CPC ..... F02M 2200/853; F02M 2200/8023; F02M 2200/09; F02M 55/004
See application file for complete search history.

(56) References Cited

U.S. PATENT DOCUMENTS 4,327,690 A * 5/1982 Sauer ................... F02M 61/145
                                                    123/198 D
4,431,218 A * 2/1984 Paul, Jr. ................ F16L 37/144
                                                    285/305
(Continued)

FOREIGN PATENT DOCUMENTS

DE   10 2005 020380   11/2006
EP        1 262 652    12/2002
(Continued)

OTHER PUBLICATIONS

International Search Report for PCT/EP2014/050561, dated Mar. 11, 2014.

*Primary Examiner* — Hieu T Vo
*Assistant Examiner* — Sherman Manley
(74) *Attorney, Agent, or Firm* — Norton Rose Fulbright US LLP; Gerard Messina

(57) ABSTRACT

A connecting element connecting a fuel injection valve to a fuel-conducting component includes: a main body having a receptacle space into which a fuel connector of the fuel injection valve is introduced; and a fastening element. At
(Continued)

least one opening is provided in a wall of the main body surrounding the receptacle space. The fastening element for fastening the fuel connector on the main body is brought into the receptacle space at least partly through the at least one opening. At least one elastic bearing element is provided, and the fastening element brought at least partly through the opening into the receptacle space is supported on the wall of the main body via the at least one elastic bearing element.

12 Claims, 2 Drawing Sheets

(51) Int. Cl.
    *F02M 55/02*     (2006.01)
    *F02M 63/00*     (2006.01)
    *F16L 21/08*     (2006.01)
    *F16L 37/12*     (2006.01)

(52) U.S. Cl.
    CPC ......... *F02M 63/0012* (2013.01); *F16L 21/08* (2013.01); *F16L 37/1225* (2013.01); *F02M 2200/09* (2013.01); *F02M 2200/803* (2013.01); *F02M 2200/8023* (2013.01); *F02M 2200/853* (2013.01); *F02M 2200/855* (2013.01)

(56) References Cited

U.S. PATENT DOCUMENTS

| | | | | |
|---|---|---|---|---|
| 4,537,427 A | | 8/1985 | Cooke | |
| 4,707,262 A | * | 11/1987 | Murken | B01D 29/15 210/448 |
| 4,982,983 A | * | 1/1991 | Lenzi | F02M 55/004 285/281 |
| 5,901,688 A | * | 5/1999 | Balsdon | F02M 25/0836 123/470 |
| 5,909,725 A | * | 6/1999 | Balsdon | F02M 25/0836 123/470 |
| 5,970,953 A | * | 10/1999 | Lorraine | F02M 61/14 123/456 |
| 6,637,411 B2 | * | 10/2003 | Makiyama | F02M 61/14 123/456 |
| 7,334,571 B1 | * | 2/2008 | Beardmore | F02M 61/14 123/456 |
| 7,458,363 B2 | * | 12/2008 | Blank | F02M 61/14 123/470 |
| 7,540,273 B2 | * | 6/2009 | Scheffel | F02M 61/14 123/470 |
| 7,556,022 B1 | * | 7/2009 | Doherty | F02M 55/004 123/456 |
| 7,765,984 B2 | * | 8/2010 | Fuerst | F02M 55/025 123/456 |
| 7,856,962 B2 | * | 12/2010 | Harvey | F02M 55/025 123/470 |
| 7,938,455 B2 | | 5/2011 | Rapp | |
| 7,942,453 B2 | * | 5/2011 | Grandi | F02M 55/005 285/305 |
| 8,646,434 B2 | * | 2/2014 | Harvey | F02M 55/005 123/456 |
| 2007/0266996 A1 | * | 11/2007 | Zdroik | F02M 55/005 123/445 |
| 2009/0056674 A1 | * | 3/2009 | Furst | F02M 61/14 123/470 |
| 2009/0064972 A1 | * | 3/2009 | Abe | F02M 55/004 123/456 |
| 2010/0012093 A1 | * | 1/2010 | Pepperine | F02M 55/004 123/470 |
| 2014/0027543 A1 | * | 1/2014 | Solferino | F02M 61/14 239/533.2 |
| 2014/0203111 A1 | * | 7/2014 | Fischer | F02M 55/005 239/584 |
| 2016/0177903 A1 | * | 6/2016 | Di Domizio | F02M 61/14 123/470 |

FOREIGN PATENT DOCUMENTS

| | | |
|---|---|---|
| JP | S61164881 U | 10/1986 |
| JP | 2001241584 A | 9/2001 |
| JP | 2007120516 A | 5/2007 |
| JP | 2008531918 A | 8/2008 |
| JP | 2010501055 A | 1/2010 |
| JP | 2015514903 A | 5/2015 |
| JP | 2016161727 A | 9/2016 |
| WO | WO 2013/160064 | 10/2013 |

\* cited by examiner ional to a fuel injection system having such a connecting element. Specifically, the present invention relates to the area of fuel injection systems for mixture-compressing externally ignited internal combustion engines.

FUEL INJECTION SYSTEM HAVING A FUEL-CONDUCTING COMPONENT, A FUEL INJECTION VALVE AND A CONNECTION ELEMENT

BACKGROUND OF THE INVENTION

1. Field of the Invention

The present invention relates to a connecting element for fuel injection systems for connecting a fuel injection valve to a fuel-conducting component, and to a fuel injection system having such a connecting element. Specifically, the present invention relates to the area of fuel injection systems for mixture-compressing externally ignited internal combustion engines.

2. Description of the Related Art

From published German patent application document DE 10 2005 020 380 A1, a fuel injection device is known that is distinguished by a design that decouples sound. The known fuel injection device includes a fuel injection valve, a receptacle bore for the fuel injection valve in a cylinder head, and a fuel distributor line having a connecting piece into which the fuel injection valve is brought in partly overlapping fashion. In a possible embodiment, a connecting element is provided that on the one hand grasps a holding collar of the fuel injection valve in the region of a housing shoulder, and on the other hand is connected to the connecting piece by a non-material connection, for example a snap connection. The connecting body is realized with a tubular shape, and has an opening for clamping an electrical connecting plug of the fuel injection valve. Outside this opening, the connecting body can be realized in 360° circumferential fashion. On the housing shoulder, the fuel injection valve is grasped by a holding collar of the connecting body, so that the fuel injection valve is freely suspended with a spacing relative to a radially running shoulder of the receptacle bore. On its end facing the connecting piece, the connecting body has, seen circumferentially, two oppositely situated slits that for example have an opening of approximately 90°. The slits are grasped by a clip-shaped, U-shaped snap ring. In addition, the snap ring engages, in the circumferential region of the slits in the connecting body, in two slit-shaped grooves on the circumference of the connecting piece for the secure fastening of the connecting body on the fuel distributor line. A hold-down clamp is also provided.

The embodiment of the fuel injection device known from published German patent application document DE 10 2005 020 380 A1 has the disadvantage that vibrations are transmitted from the fuel injection valve to the connecting piece via the connecting body and the snap ring. In addition, the embodiment requires a large constructive outlay, and is comparatively unstable due to a long lever arm of the connecting body. This also has a disadvantageous effect on the ease of installation.

Specifically in the case of electromagnetic high-pressure injection valves, which can be used in gasoline engines having direct injection, a noticeable and disturbing contribution may be made to the overall noise level of the engine, which can be described as valve ticking. Such valve ticking arises due to the rapid opening and closing of the fuel injection valve, in which the valve needle is moved to its respective end stop positions with a high dynamic characteristic. The impacting of the valve needle at the end stop positions causes brief but very high contact forces that are transmitted via a housing of the fuel injection valve to the cylinder head and to a fuel distributor rail, in the form of structure-borne sound and vibrations. Among other things, this causes a strong development of noise at the fuel distributor rail.

BRIEF SUMMARY OF THE INVENTION

The connecting element according to the present invention, and the fuel injection system according to the present invention, have the advantage that an improved connection of the fuel injection valve to the fuel-conducting component is enabled, enabling a reduction of noise. Specifically, a soft connecting of the fuel injection valve to the fuel-conducting component can be achieved.

Specifically, the connecting element and the fuel injection system are suitable for the direct injection of gasoline. The fuel-conducting component is here preferably fashioned as a fuel distributor, in particular as a fuel distributor rail. Such a fuel distributor can, on the one hand, be used to distribute the fuel to a plurality of fuel injection valves, in particular high-pressure injection valves. On the other hand, the fuel distributor can act as a common fuel storage unit for the fuel injection valves. The fuel injection valves are then preferably connected to the fuel distributor via corresponding connecting elements. During operation, the fuel injection valves then inject the fuel necessary for the combustion process into the respective combustion chamber, under high pressure. Here, the fuel is compressed by a high-pressure pump, and is conveyed, with control of quantity, into the fuel distributor via a high-pressure line.

The fuel injection valve, in particular the fuel connector, is not a component of the connecting element according to the present invention. In addition, the fuel-conducting component is not necessarily a component of the connecting element according to the present invention. Depending on the particular application, the connecting element can however be an element of the fuel-conducting component, and may be integrated therein. The connecting element according to the present invention can also be produced and distributed separately from a fuel injection valve, and, possibly, separately from a fuel-conducting component.

Advantageously, the elastic bearing element is situated on the opening provided in the wall of the main body. The elastic bearing element can however also be provided outside the wall, in particular in the region of the receptacle space. However, it is advantageous for the elastic bearing element to be situated, at least substantially, only at the opening provided in the wall of the main body.

Here it is also advantageous that the opening provided in the wall of the main body is formed by a bore that extends from an outer side of the wall in the receptacle space, that the elastic bearing element is fashioned as a sleeve-shaped elastic bearing element, and that the sleeve-shaped bearing element extends at least along the bore through the wall. Preferably, the sleeve-shaped bearing element here extends at least significantly only along the bore through the wall, so that it is essentially provided only in the area of the bore. In this way, an elastic mounting of the fastening element in the main, body is enabled. This realizes a soft suspension of the fuel injection valve. For the bearing element, the desired elasticity can be specified via the selection of the material. In this way, a bearing for the fastening element on the main body can be realized by one or more elastic bearing elements. The elastic bearing element can in particular be made of a plastic.

It is advantageous that the fastening element has at least one rod-shaped arm, and that a second opening is provided in the wall of the main body that is formed by a second bore, and that the second bore extends from the outer side of the wall into the receptacle space, and that the bore and the second bore are situated on a common axis of insertion for the rod-shaped arm of the fastening element, and that a second sleeve-shaped elastic bearing element is provided that extends along the second bore through the wall, and that the rod-shaped arm of the fastening element can be guided along the common axis of insertion through the bore and through the second bore, and that the rod-shaped arm of the fastening element, guided through the first bore and through the second bore, is supported on the wall of the main body via the elastic bearing element and the second elastic bearing element. During installation, the fuel connector can first be inserted into the receptacle space of the main body. The fastening element can then be inserted into the main body with its rod-shaped arm along the common axis of insertion. In this way, a soft suspension of the fuel injection valve can easily be achieved.

Here it is also advantageous that the fastening element has a further rod-shaped arm, and that in the wall of the main body there are provided a third opening formed by a third bore and a fourth opening formed by a fourth bore, and that the third bore and the fourth bore extend from the outer side of the wall into the receptacle space, and that the third bore and fourth bore are situated on a common further axis of insertion for the further rod-shaped arm of the fastening element, and that a third sleeve-shaped elastic bearing element that extends along the third bore through the wall and a fourth sleeve-shaped elastic bearing element that extends along the fourth bore through the wall are provided, and that the further rod-shaped arm of the fastening element can be guided along the common further insertion axis through the third bore and the fourth bore, and that the fastening element guided through the third bore and the fourth bore is supported on the wall of the main body via the third elastic bearing element and the fourth elastic bearing element. Here, the fastening element can in particular advantageously be fashioned as a U-shaped fastening element. The fastening element can be made of a metallic material. Preferably, at least the rod-shaped arms of the fastening element are made of such a metallic material. In order to facilitate the attachment of the fastening element, it is advantageous for the insertion axis and the further insertion axis to be oriented parallel to one another. However, here a certain tensioning of the U-shaped fastening element may also be required, through a bending together or towards one another of the two arms. In this case, a certain pre-tension is then achieved in the assembled state, which for example ensures a securing against loss.

The insertion axis and the further insertion axis are preferably oriented perpendicular to an axis of the receptacle space. In this way, the occurrence of transverse forces when the fuel injection valve is mounted on the main body can be avoided.

In a further embodiment, it is also conceivable for the elastic bearing element to be provided on an inner side of the wall of the main body. Preferably, in this case the main body has an opening via which the fuel connector can be guided into the receptacle space, the wall of the main body having an annular end face that surrounds the opening, and the elastic bearing element extending from an outer side of the wall via the end face of the wall to the inner side of the wall. For example, the elastic bearing element can be clipped onto the main body in the region of the annular end face. This enables a low-cost embodiment and easy installation. Here, the elastic bearing element preferably extends circumferentially over the inner side of the wall. This enables a soft mounting at all sides.

In the drawings, corresponding elements are provided with the same reference characters.

DETAILED DESCRIPTION OF THE INVENTION

Figure 1:
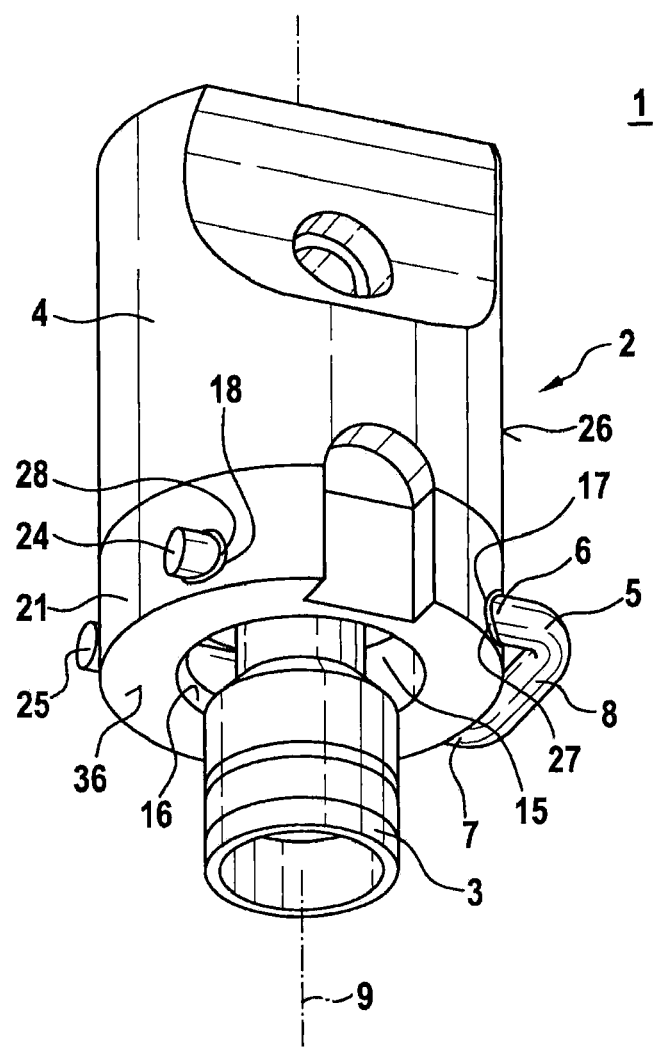
FIG. 1 shows a fuel injection system having a connecting element and a fuel connector of a fuel injection valve corresponding to a first exemplary embodiment, in a partial schematic spatial representation.

FIG. 1 shows a fuel injection system 1 having a connecting element 2 and a fuel connector 3 of a fuel injection valve corresponding to a first exemplary embodiment, in a partial schematic spatial representation. Fuel injection system 1 can be used in particular for high-pressure injection in internal combustion engines. Specifically, fuel injection system 1 can be used in mixture-compressing externally ignited internal combustion engines. Connecting element 2 is particularly suitable for such a fuel injection system 1.

Fuel injection system 1 preferably has a plurality of such connecting elements 2 in order to produce a connection to a plurality of fuel connectors 3 of a corresponding number of fuel injection valves. In this way, fuel injection system 1 can be specifically fashioned as a fuel injection system 1 for high-pressure injection in internal combustion engines, and fuel under high pressure can be apportioned to a plurality of fuel injection valves.

In this embodiment, fuel connector 3 is fashioned as connecting sleeve 3. Connecting element 2 has a main body 4 and a fastening element 5. Fuel connector 3 is connected to main body 4 via fastening element 5. Here, direct contact between fuel connector 3 and main body 4 is avoided.

Fastening element 5 has a rod-shaped arm 6 and a further rod-shaped arm 7. In addition, fastening element 5 has a clip segment 8 via which rod-shaped arms 6, 7 are connected to one another. Fastening element 5 can for example be made of a metallic material.

The construction of fuel injection system 1 and of connecting element 2 is further described below, also with reference to FIG. 2.

Figure 2:
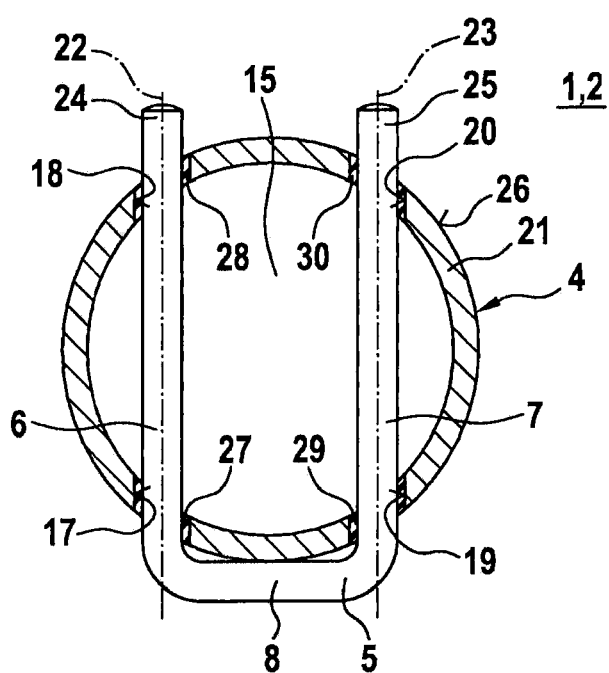
FIG. 2 shows a connecting element of the fuel injection system shown in FIG. 1 in a partial schematic sectional representation corresponding to the first exemplary embodiment of the present invention.

FIG. 2 shows connecting element 2 of fuel injection system 1 shown in FIG. 1, in a partial schematic sectional representation corresponding to the first exemplary embodiment, in which fuel connector 3 is not shown in order to simplify the representation. Here, the sectional plane is made perpendicular to an axis 9 of fuel connector 3 of the fuel injection valve.

Main body 4 has a receptacle chamber 15. During assembly, fuel connector 3 is inserted at least partly into receptacle space 15 via an opening 16 of main body 4. The main body has a first opening 17, a second opening 18, a third opening 19, and a fourth opening 20. Openings 17 through 20 are here made in a wall 21 of main body 4. In this exemplary embodiment, first opening 17 is formed by a first bore 17. Second opening 18 is formed by a second bore 18. Third opening 19 is formed by a third bore 19. Fourth opening 20 is formed by a fourth bore 20. First bore 17 and second bore 18 are situated on a common axis 22. Third bore 19 and fourth bore 20 are situated on a further common axis 23.

During installation of fastening element 5, fastening element 5 is guided with its rod-shaped arms 6, 7 through openings 17 through 20 until an end 24 of rod-shaped arm 26 and an end 25 of further rod-shaped arm 7 extend somewhat from main body 4. Rod-shaped arms 6, 7 then extend through receptacle space 15.

In this exemplary embodiment, axes 22, 23 are oriented parallel to one another. In addition, axes 22, 23 are oriented perpendicular to axis 9 of fuel connector 3. Axis 9 here agrees with axis 9 of receptacle space 15 of main body 4.

Openings 17 through 20, or bores 17 through 20, extend from an outer side 26 of wall 21 of main body 4 into receptacle space 15. Bores 17 through 20 are thus fashioned as through-bores 17 through 20.

In this exemplary embodiment, a first elastic sleeve-shaped bearing element 27 is situated in first bore 17. A second elastic sleeve-shaped bearing element 28 is situated in second bore 18. A third elastic sleeve-shaped bearing element 29 is situated in third bore 19. A fourth elastic sleeve-shaped bearing element 30 is situated in fourth bore 20. Here, first bearing element 27 and second bearing element 28 are situated on the same axis 22. Third bearing element 29 and forth bearing element 30 are situated on the same axis 23. In this exemplary embodiment, first sleeve-shaped bearing element 27 and second sleeve-shaped bearing element 28 extend only in the area of first bore 17, or of second bore 18, along the common axis 22. In addition, third sleeve-shaped bearing element 29 and fourth sleeve-shaped bearing element 30 extend along the further common axis 23 only in the region of third bore 19 or of fourth bore 20. Bearing elements 27 through 30 therefore on the one hand do not significantly extend into receptacle space 15 and on the other hand do not extend, at least significantly, past outer side 26.

Common axis 22 represents a common insertion axis 22 for first rod-shaped arm 6 for installation. Further common axis 23 represents, during installation, a further common insertion axis 23 for further rod-shaped arm 7. Thus, installation of fastening element 5 on main body 4 can easily take place through insertion.

Thus, for the fastening of fuel connector 3 on main body 4, fastening element 5 can be brought into receptacle space 15 through openings 17 through 20. In the assembled state, the fastening element brought partly through openings 17 through 20 into receptacle space 15 ensures, via elastic bearing element 27 through 30, an elastic and soft supporting of fuel connector 3 on main body 4. Here, fastening element 5 itself is supported elastically on wall 21 of main body 4 via elastic bearing elements 27 through 30.

In this exemplary embodiment, fastening element 5 is fashioned as U-shaped fastening element 5. In the assembled state, clip segment 8 of fastening element 5 preferably lies against outer side 26 of main body 4. In this way, to some extent a stop for the installation is formed.

A desired spring rigidity for the suspension of the fuel injection valve on main body 4 can be specified via the selection of the material for bearing elements 27 through 30. In particular, a spring rigidity of not more than 50 kN/mm can be specified.

Figure 3:
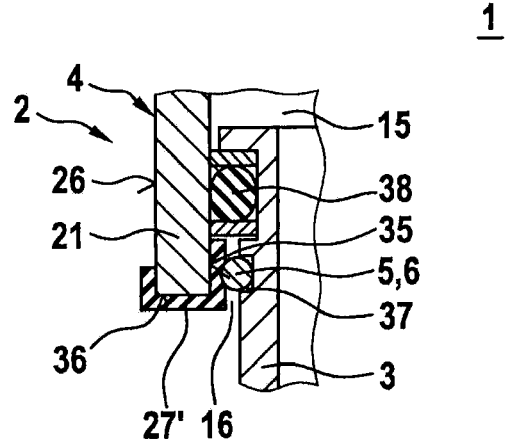
FIG. 3 shows a fuel injection system having a connecting element and a fuel connector of the fuel injection valve corresponding to a second exemplary embodiment of the present invention, in a partial schematic sectional representation.

FIG. 3 shows a fuel injection system 1 having a fuel connector 3 of a fuel injection valve and having a connecting element 2 corresponding to a second exemplary embodiment, in a partial schematic sectional representation. In this exemplary embodiment, elastic bearing element 27' is provided on an inner side 35 of wall 21 of main body 4. Main body 4 has an end face 36.

In this exemplary embodiment, end face 36 is fashioned as circular annular end face 36. Circular annular end face 36 on wall 21 here surrounds opening 16 for receptacle space 15. Bearing element 27' extends from outer side 26 over end face 36 of wall 21 to inner side 35 of wall 21. Bearing element 27' also extends circumferentially over inner side 35 of wall 21. In the assembled state, rod-shaped arm 6 of fastening element 5 lies against bearing element 27' on the one hand and against fuel connector 3 on the other hand. Here, arm 6 of fastening element 5 is inserted into an opening 37 of fuel connector 3. In this way, an elastic supporting is ensured.

Moreover, in this exemplary embodiment an O-shaped sealing ring 38 is provided that forms a seal between wall 21 of main body 4 and fuel connector 3. Bearing element 27' can be made of a desired material. Here, an axial support can also be ensured by bearing element 27'. Here, an undercut can also be formed by bearing element 27'.

In this way, a decoupling can be realized having a desired decoupling rigidity and required strength, and the requirements can be met over the lifespan even given high system pressures. In particular, a soft connection of the fuel injection valve to a fuel distributor rail or some other fuel-conducting component is possible. In this way, a noise reduction can be achieved. Moreover, this measure can be used in addition to other noise reduction measures. In particular, in addition a hydraulic throttle can be realized on a valve inlet. A soft rail screw connection or the like can also be provided in a corresponding embodiment of fuel injection system 1.

Thus, a combination with other features for noise reduction can advantageously take place.

The present invention is not limited to the depicted exemplary embodiments.

What is claimed is:

1. A connecting element for connecting a fuel injection valve to a fuel-conducting component, comprising:
   a main body having a receptacle space into which a fuel connector of the fuel injection valve is at least partly introduced, wherein at least one opening is provided in a wall of the main body surrounding the receptacle space, the at least one opening including a first bore which extends from an outer side of the wall into the receptacle space;
   a fastening element configured to be brought into the receptacle space at least partly through the first bore for the fastening of the fuel connector on the main body; and
   at least one elastic bearing element, wherein the fastening element brought into the receptacle space partly through the first bore is supported on the wall of the main body via the at least one elastic bearing element, the at least one elastic bearing element extending through the first bore.

2. The connecting element as recited in claim 1, wherein the at least one elastic bearing element is situated at the at least one opening provided in the wall of the main body.

3. The connecting element as recited in claim 2, wherein the at least one elastic bearing element is configured as a first sleeve-shaped elastic bearing element, and the first sleeve-shaped elastic bearing element extends at least along the first bore through the wall.

4. The connecting element as recited in claim 3, wherein the first sleeve-shaped elastic bearing element extends essentially only along the first bore through the wall.

5. The connecting element as recited in claim 3, wherein:
the fastening element has at least a first rod-shaped arm;
a second opening formed by a second bore is provided in the wall of the main body, the second bore extending from the outer side of the wall into the receptacle space;
the first bore and the second bore are situated on a common insertion axis for the first rod-shaped arm of the fastening element;
a second sleeve-shaped elastic bearing element extending along the second bore through the wall is provided;
the first rod-shaped arm of the fastening element is configured to be guided along the common insertion axis through the first bore and through the second bore; and
the first rod-shaped arm of the fastening element, guided through the first bore and through the second bore, is supported on the wall of the main body via the first sleeve-shaped elastic bearing element and the second sleeve-shaped elastic bearing element.

6. The connecting element as recited in claim 5, wherein:
the fastening element has a second rod-shaped arm;
a third opening formed by a third bore in the wall of the main body and a fourth opening formed by a fourth bore in the wall of the main body are provided;
the third bore and the fourth bore extend from the outer side of the wall into the receptacle space;
the third bore and the fourth bore are situated on a further common insertion axis for the second rod-shaped arm of the fastening element;
a third sleeve-shaped elastic bearing element extending along the third bore through the wall is provided;
a fourth sleeve-shaped elastic bearing element extending along the fourth bore through the wall is provided;
the second rod-shaped arm of the fastening element is guided along the further common insertion axis through the third bore and through the fourth bore; and
the fastening element guided through the third bore and through the fourth bore is supported on the wall of the main body via the third sleeve-shaped elastic bearing element and the fourth sleeve-shaped elastic bearing element.

7. The connecting element as recited in claim 6, wherein at least one of: (i) the fastening element is a U-shaped fastening element, (ii) the insertion axis and the further insertion axis are oriented at least approximately parallel to one another, (iii) the insertion axis is oriented at least approximately perpendicular to an axis of the receptacle space, and (iv) the further insertion axis is oriented at least approximately perpendicular to the axis of the receptacle space.

8. The connecting element as recited in claim 7, wherein at least the first rod-shaped arm and the second rod-shaped arm of the fastening element are formed of a metallic material.

9. The connecting element as recited in claim 1, wherein the elastic bearing element is provided on an inner side of the wall of the main body.

10. A connecting element for connecting a fuel injection valve to a fuel-conducting component, comprising:
a main body having a receptacle space into which a fuel connector of the fuel injection valve is at least partly introduced, wherein at least one opening is provided in a wall of the main body surrounding the receptacle space;
a fastening element configured to be brought into the receptacle space at least partly through the at least one opening for the fastening of the fuel connector on the main body; and
at least one elastic bearing element, wherein the fastening element brought into the receptacle space partly through the at least one opening is supported on the wall of the main body via the at least one elastic bearing element,
wherein the main body has an opening via which the fuel connector is guided into the receptacle space, the wall of the main body has an annular end face which surrounds the opening via which the fuel connector is guided into the receptacle space, and the elastic bearing element extends from an outer side of the wall via the annular end face of the wall to the inner side of the wall.

11. The connecting element as recited in claim 10, wherein the first elastic bearing element extends circumferentially over the inner side of the wall.

12. A fuel injection system, comprising:
at least one fuel-conducting component;
at least one fuel injection valve; and
at least one connecting element connecting the fuel injection valve to the fuel-conducting component, the at least one connecting element including:
a main body having a receptacle space into which a fuel connector of the fuel injection valve is at least partly introduced, wherein at least one opening is provided in a wall of the main body surrounding the receptacle space, the at least one opening including a first bore which extends from an outer side of the wall into the receptacle space;
a fastening element configured to be brought into the receptacle space at least partly through the first bore for the fastening of the fuel connector on the main body; and
at least one elastic bearing element, wherein the fastening element brought into the receptacle space partly through the first bore is supported on the wall of the main body via the at least one elastic bearing element, the at least one elastic bearing element extending through the first bore.

* * * * *